(12) United States Patent
Flament et al.

(10) Patent No.: US 9,233,580 B2
(45) Date of Patent: Jan. 12, 2016

(54) TIRE HAVING LOW ROLLING FRICTION

(75) Inventors: Julien Flament, Clermont-Ferrand (FR); François Le-Hen, Clermont-Ferrand (FR)

(73) Assignees: COMPAGNIE GENERALE DES ESTABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 878 days.

(21) Appl. No.: 13/516,073

(22) PCT Filed: Dec. 16, 2010

(86) PCT No.: PCT/EP2010/069880
§ 371 (c)(1),
(2), (4) Date: Jul. 12, 2012

(87) PCT Pub. No.: WO2011/073313
PCT Pub. Date: Jul. 23, 2011

(65) Prior Publication Data
US 2013/0192733 A1     Aug. 1, 2013

(30) Foreign Application Priority Data
Dec. 17, 2009 (FR) ..................... 09 59095

(51) Int. Cl.
*B60C 11/13* (2006.01)

(52) U.S. Cl.
CPC ............. *B60C 11/1307* (2013.04); *B60C 11/13* (2013.01); *B60C 2011/1338* (2013.04)

(58) Field of Classification Search
CPC .. B60C 11/1307; B60C 11/13; B60C 11/042; B60C 11/045; B60C 11/047; B60C 11/1369; B60C 2011/1338; B60C 2011/0369
USPC ....................... 152/209.21, 209.22
IPC ....................... B60C 11/13
See application file for complete search history.

(56) References Cited

U.S. PATENT DOCUMENTS

| 5,918,654 A | 7/1999 | Bossut |
| 6,408,910 B1 | 6/2002 | Lagnier et al. |
| 2006/0011279 A1* | 1/2006 | Miyasaka ........... B60C 11/0306 152/209.15 |

FOREIGN PATENT DOCUMENTS

| EP | 0 787 601 A1 | 8/1997 |
| FR | 2 763 892 A1 | 12/1998 |

(Continued)

OTHER PUBLICATIONS

Machine translation of JP2003-159910 (no date).*
Machine translation of JP2009-029255 (no date).*
Written Opinion of the International Searching Authority for PCT/EP2010/069880.*

(Continued)

*Primary Examiner* — Richard Crispino
*Assistant Examiner* — Philip N Schwartz
(74) *Attorney, Agent, or Firm* — Dickinson Wright PLLC

(57) ABSTRACT

Tire tread provided with circumferential grooves delimiting two edge rows provided with a plurality of transverse grooves, those of one edge row forming at least one bearing block protruding on at least one delimiting wall, each comprising a surface capable of coming into contact with another surface during contact with the ground and at least one passageway for a fluid between each bearing block of a groove and the bottom of the groove. For each edge row, the mean surface indentation ratio Tc is at least 0.7 and at most 1.6 times E/R, where E is the mean thickness for all grooves comprising active surfaces measured between a radially outermost point of the active surface and a radially outermost point of the reinforcing belt, R is the mean distance for all transverse grooves comprising active surfaces measured between the point of the active surface that is radially outermost and the rotation axis of the tire provided with the tread.

8 Claims, 3 Drawing Sheets

(56) References Cited

FOREIGN PATENT DOCUMENTS

| | | | |
|---|---|---|---|
| JP | 4-345504 A | 12/1992 | |
| JP | 2003-159910 A | 6/2003 | |
| JP | 2009029255 A * | 2/2009 | .............. B60C 11/11 |
| WO | WO 99/48707 A1 | 9/1999 | |

OTHER PUBLICATIONS

International Search Report (PCT/ISA/210) issued on Mar. 2, 2011, by the European Patent Office as the International Searching Authority for International Application No. PCT/EP2010/069880.
French Search Report issued on May 19, 2010.

* cited by examiner

TIRE HAVING LOW ROLLING FRICTION

The present invention relates to treads of tire casings intended to be fitted to passenger motor vehicles.

The problem of reducing power consumption for the movement of a vehicle is an important problem and is becoming essential nowadays. Very often, this problem determines the development and marketing of certain tires. The recognition of this problem by those skilled in the art involves obtaining tires having a reduced rolling resistance. "The rolling resistance" of a tire means the amount of energy consumed by the tire in order to set it in motion, this amount of energy not being restored by the said tire.

It is known that the rolling resistance of a tire when running is associated with the energy losses in the said tire which are partly dependent on the hysteresis characteristics of the rubber mixtures employed and most particularly on those comprising the tread and partly dependent on the deformation cycles sustained by the said mixtures when the tire is running.

If it is considered what happens during the running of a tire comprising a tread, it is found that, in the contact zone, the tread is subjected to the action of pressure forces perpendicular to the surface of contact with the ground surface, these forces balancing out the load borne by the tire, to the action of shearing forces tangential to the surface of contact and oriented both longitudinally and transversely, and to inner compression forces resulting from the variation in curvature of the said tread. The tangential forces are the direct consequence of the contact between the ground surface and the rolling surface of the tire tread and the existence of friction between the said surfaces. Under the effect of the compression forces, resulting from the flexing of the tread, and due to the existence of the forces tangential to the rolling surface, a deformation of the tread is generated in the thickness direction equivalent to a thickening of the said tread. This deformation, in the thickness direction of the tread is only partly limited by the contact forces acting perpendicularly to the rolling surface in the contact zone and the forces of inflation pressure being applied inside the tire.

One option for reducing the energy losses of a tire when running relates to reducing the energy losses resulting from the hysteresis characteristics of the rubber mixtures employed and more particularly of the mixtures comprising the tread.

Another option for reducing the energy losses relates to the way in which the tread is provided with cut-outs, these cut-outs being made in the form of notches and/or incisions, in order to form a sculpture design. An "incision" means a cut-out delimited by facing walls that are not very far apart allowing them to come into contact with one another when running. A "groove" means a cut-out of which the facing walls cannot come into contact with one another in normal running conditions; a groove has a thickness at least equal to 2 mm.

It is known from patent EP0787601-B1 that it is possible to achieve this objective by producing a tire tread having a plurality of incisions of transverse orientation of which the number and the width are determined precisely as a function of the geometric dimensions of the tire, notably of its circumferential and meridian curvatures (the latter being obtained in a plane containing the rotation axis of the tire provided with the said tread).

This teaching is fully satisfactory in the matter of reducing the hysteresis losses of the materials of the tread when the tire is running. However, it seems that the tire tread thus constituted has reduced performance notably when running on road surfaces covered with water particularly during rainy weather.

The object of the invention is to obtain a new tread which combines both a substantial improvement in rolling resistance performance without causing a deterioration in performance when running on any type of ground surface and notably a ground surface covered with a film of water.

The tire according to the invention is reinforced with a carcass reinforcement and with a reinforcing belt radially outside the carcass reinforcement. This tire comprises a tread having a rolling surface designed to come into contact with a ground surface during the running of the tire, this tread comprising grooves of circumferential orientation, these grooves of circumferential orientation delimiting rows of sculpture elements comprising two edge rows axially delimiting the said tread. These edge rows are provided with a plurality of transverse grooves in order to allow the water to flow towards the outside of the tread, each transverse groove with a width at least equal to 2 mm, having a depth and being delimited by walls facing one another.

Moreover, a plurality of the transverse grooves of one edge row comprises at least one bearing block protruding on at least one wall delimiting the groove in question, each bearing block comprising an active surface, that is to say a surface capable of coming into contact with another surface during the passage in contact with the ground surface, this active surface being at a circumferential length of opening Ha from the said other surface, this circumferential length of opening Ha being measured on the tire inflated to its pressure of use. This tread may also, but this is not necessary for the invention, comprise a plurality of transverse incisions of width Hi formed on at least one edge row.

This tread is characterized in that the total of the areas of the active surfaces of a transverse groove is at least equal to 10% and at most equal to 50% of the area of the wall surface on which these active surfaces are formed, the maximum length in the transverse direction of a virtual convex surface surrounding all of the active surfaces of a transverse groove and of shorter contour length is at least twice as great as the maximum height of this same virtual convex surface taken in the direction of the depth of the transverse groove, there is at least one passageway for a fluid between each bearing block of a groove and the bottom of the said groove, this passageway having at least a radial height equal to 10% of the depth of the groove, each edge row has a mean surface indentation ratio Tc, this indentation ratio being calculated by taking the ratio between the total of the circumferential lengths of opening Ha of all the active surfaces of the bearing blocks of the edge row in question, for all the grooves comprising at least one bearing block, and of the circumferential lengths Hi of the transverse incisions, this total being divided by the total circumferential length of the edge tread minus the circumferential lengths of the grooves with no blocks, this mean surface indentation ratio Tc for each edge row is at least equal to 0.7 and at most equal to 1.6 times the ratio E/R, E being an arithmetic mean calculated for all the grooves comprising bearing blocks of the thickness measured between a point of the active surface that is radially outermost and a radially outermost point of the reinforcing belt. R is an arithmetic mean calculated for all the transverse grooves comprising active surfaces of the distance measured between the point of the active surface of each bearing block that is radially outermost and the rotation axis of the tire provided with the tread.

If the tread has no transverse incisions on the edge rows, only the transverse grooves comprising at least one bearing block are taken into account in calculating the mean surface indentation ratio Tc.

Starting with the value determined for the surface indentation ratio in the circumferential direction, it is possible to adjust as well as possible the elastic deformations of the edge rows when passing in contact with the road surface so that these deformations are appropriate for reducing the hysteresis losses of the materials comprising the tread.

Specifically, if the tread of a tire inflated to a pressure corresponding to its pressure of use and supporting a given load is examined, it is found that the said tread has a surface, called the rolling surface, situated radially on the outside of the tire, which, outside the zone of contact with the ground surface, may be characterized as a surface with a double curvature radius, both in the meridian direction and in the circumferential direction. This surface is characterized by the fact that its intersection with a radial plane, that is to say a plane that contains the rotation axis of the tire, has a profile which has at every point a non-zero meridian curvature radius; similarly and evidently, the intersections of the rolling surface with the planes perpendicular to the rotation axis of the tire correspond to circles of which the curvature radii are virtually identical to the radius of the tire that is inflated, not loaded and measured in the equatorial plane.

It should be noted that the edge portions of a tire tread are portions with larger meridian and circumferential curvatures compared with the portion of tread situated between the two edge portions. Therefore, it is surprising that, by forming transverse grooves on the edges to obtain an advantage when running in rainy weather, it has been possible to significantly reduce the hysteresis losses when running by forming in these edge grooves bearing blocks of limited surface area according to the invention.

DEFINITIONS

The "equatorial plane" is the plane that is perpendicular to the rotation axis of the tire and that passes through the middle of the axial width of the tread.

"Groove" means any cut-out made in the tread and delimited by two facing walls emerging on the rolling surface, this groove having a width, that is to say the mean distance separating the walls of the groove between the opening and the bottom of the groove, that is on average at least 2 mm. In normal conditions of use of a tire, the walls delimiting a groove are never in contact with one another.

"Incision" means a cut-out that has a width of less than 2 mm and that has the particular feature that the facing walls delimiting the said incision may come into contact at least partially with one another. In practice, an incision has a width of less than 1 mm and yet more preferably less than 0.7 mm.

The area of a wall delimiting a transverse groove of an edge row is taken between the end of the groove emerging in a circumferential groove and the axially outermost end, this groove corresponding to the maximum axial width of contact of the tread with the road surface in nominal conditions of use of the tire.

As a general rule, if the mean surface indentation ratio Tc in the circumferential direction is less than 0.7 times the value of the expression E/R, it means that the variation in circumferential length of the rolling surface on the edge row in question, resulting from entering the zone of contact, is greater than can be absorbed merely by the closure of the transverse incisions, and there is then a compression in the circumferential direction which causes a thickening of the tread leading to a loss of energy by hysteresis.

When the mean surface indentation ratio Tc in the circumferential direction is greater than 1.6 times the value of the expression E/R, the incisions do not close completely in the zone of contact and consequently it is not possible to prevent the squashing of the tread under the action of the forces perpendicular to the rolling surface, which leads to a reduction in the thickness of the said tread and therefore to a loss of energy associated with the hysteresis of the rubber materials.

Yet more preferably, the mean surface indentation ratio Tc in the circumferential direction is at least equal to 0.8 and at most equal to 1.5.

In addition to reducing the hysteresis losses of the materials through deformation, it is advantageous to further improve the flow of water in the groove to the outside of the tread. For this, it is advantageous that at least one bearing block is formed axially towards the inside of each transverse groove of the edge row in order to form a closing block. This closing block comprises an outer profile promoting the flow of liquid axially outwards in combination with at least one other bearing block. Advantageously, this closing block comprises a profile with a curved and convex shape, this convex profile extending between the radially outermost portion and the bottom of the groove, its center of curvature being situated axially towards the outside of the said closing block. Naturally, this closing block helps to control the deformations resulting from the flattening of the tire in contact in order to limit the hysteresis losses when running.

In practice, each bearing block can be formed on a single wall delimiting a transverse groove.

In one variant, each bearing block may consist of two half-bearing blocks facing one another by their respective bearing surfaces.

Advantageously, to stiffen the tread, the active surface of a plurality of bearing blocks has a geometry comprising indentations and raised elements, these indentations and raised elements interacting with one another in order to immobilize at least partially and at least in one direction the relative movements of a wall of the groove relative to the facing wall of the groove.

It has also been found that while retaining the satisfactory performance in energy loss through deformation of material of the tread, it was possible to further improve the flow in the transverse grooves and in the circumferential grooves into which these transverse grooves emerge. To do this, at least one transverse groove comprises an end closing block supported by at least one wall of the transverse groove over a height, measured from the bottom of the groove, that is at least equal to 80% of the mean depth of the groove, this closing block being formed in the vicinity of the longitudinal groove into which the transverse groove emerges so as to close at least in part the transverse groove and help the flow in the transverse groove and in the circumferential groove.

Advantageously, this closing block is formed as a bearing block of the transverse groove by assigning it a bearing surface that can be in contact with a facing surface when coming into contact. If this is the case, the bearing surface of the closing block must be incorporated into the total bearing surface of the groove and, in this case, the area of the bearing surface of the closing block is at least equal to 5% and at most equal to 30% of the area of the wall surface on which this closing block is formed.

For the transverse groove in question comprising both a closing block and at least one other bearing block, in total, a total bearing surface of 10% to 50% of the area of the wall surface is retained.

In order to improve the flow of water in the transverse groove, it is advantageous that, with the closing block having an axially inner surface and an axially outer surface, the axially inner surface facing the circumferential or longitudinal groove and the axially outer surface oriented axially towards the outside of the tread, the outer surface of the closing block has, seen in radial section, a curvilinear shape. This shape may notably be of the "toboggan" concave type.

In order to prevent too great an interaction between the closing block and the bearing blocks of one and the same groove, it is wise to have the minimum distance b between the closing block and each of the other bearing blocks of the transverse groove at least equal to 10% of the depth of the transverse groove.

The invention is illustrated by drawings which show exemplary embodiments which are in no way limiting and in which.

Figure 1:
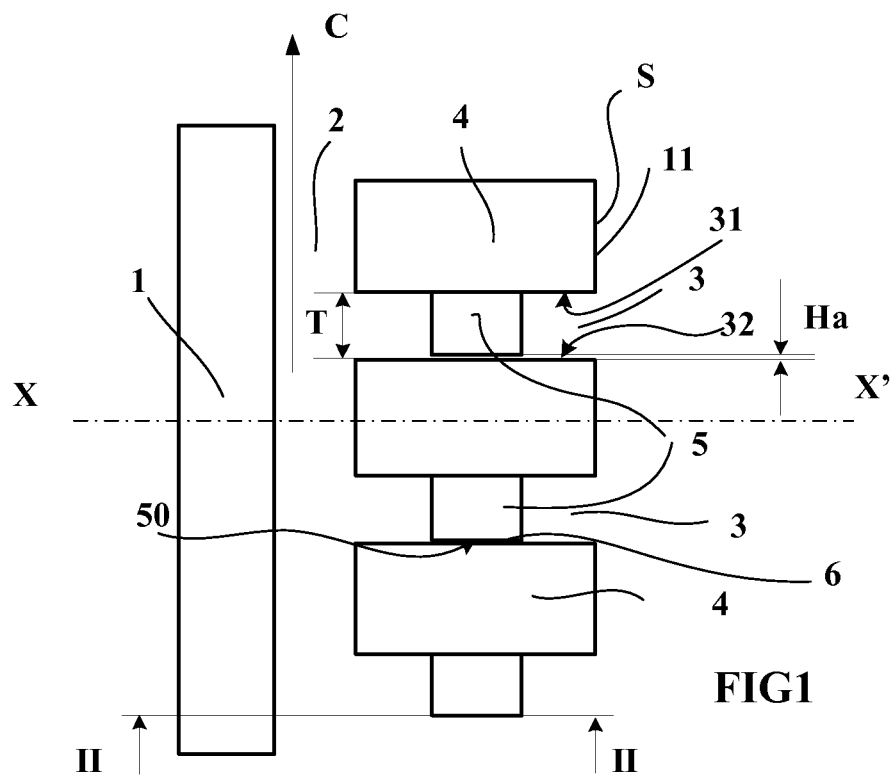
FIG. 1 shows a partial plan view of a tread comprising a bearing block in each transverse groove.

FIG. 1 shows a partial plan view of a tread 1 according to the invention; the view shows an edge 11 of this tread delimited by a circumferential groove 2. This edge 11 is provided with a plurality of transverse grooves 3 emerging both in the circumferential groove 2 and towards the outside of the tread. Each transverse groove 3 is delimited by facing walls 31, 32, one of the said walls comprising in protrusion a bearing block 5. These transverse grooves delimit a plurality of ribs 4. Each transverse groove has a width T that is greater than 2 mm.

Each bearing block 5 of a transverse groove 3 comprises an active surface 50 (that can be seen in FIG. 2) capable of coming into contact with the wall 32 of the facing groove when coming into contact with the ground surface. The active surface of each block is separated by a thin slot 6 of width Ha, this width Ha being measured on the tire inflated to its pressure of use and outside the zone of contact with the road surface.

Figure 2:
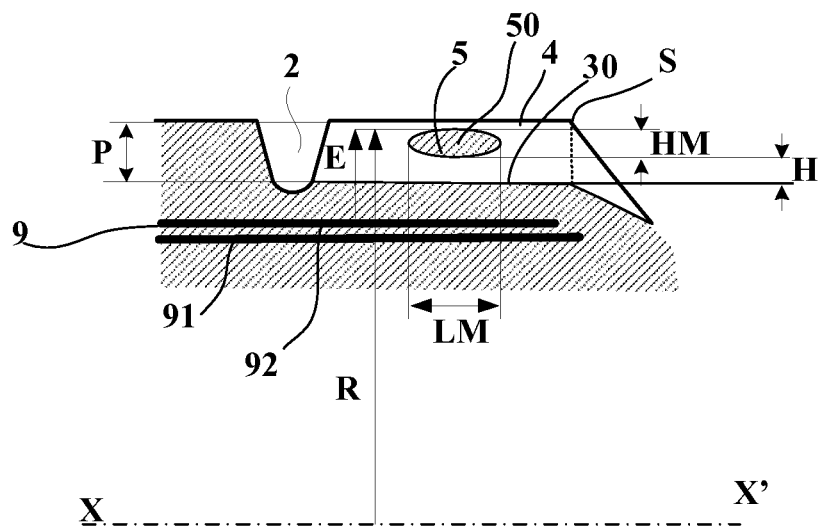
FIG. 2 shows a meridian section along a line II-II taken from FIG. 1.

As can be seen in FIG. 2 showing a section along the line II-II from FIG. 1, this tire comprises a crown reinforcement 9 formed by two reinforcing layers 91, 92. Moreover, each block 5 of one and the same groove has a maximum transverse length LM equal to at least twice the maximum height HM of this block taken in the direction of the depth P of the transverse groove.

Moreover, the area of the active surface 50 of each block, in this instance equal to the area of the section of each block seen in section, is at least equal to 10% and at most equal to 50% of the area of the surface of the wall on which the bearing block 5 is formed. This wall surface extends between the circumferential groove 2, the bottom 30 of the transverse groove 3 and a segment S, shown in dashed lines in FIG. 2, perpendicular to the rotation axis and passing through the point axially outermost of the rib 4 coming into contact with the road surface in the nominal conditions of use of the tire.

Moreover, there is a passageway for the water between the bearing block 5 and the bottom 30 of the transverse groove 3, this passageway having a height H at least equal to 10% of the depth P of the groove.

In the case of the bearing block 5 shown, the points that are radially outermost are at a distance R from the rotation axis indicated in this FIG. 2 by the axis XX', these same points are at a distance E from the radially outermost layer 92 of the crown reinforcement 9.

The area of an active surface is assessed in projection in the circumferential direction on the mean meridian plane, that is to say a plane passing through the rotation axis of the tire and through the mean circumferential position of the active surface. Similarly, the area of the surface of wall on which at least one active surface is formed is assessed in projection in the circumferential direction on the mean meridian plane of the groove in question.

Figure 3:
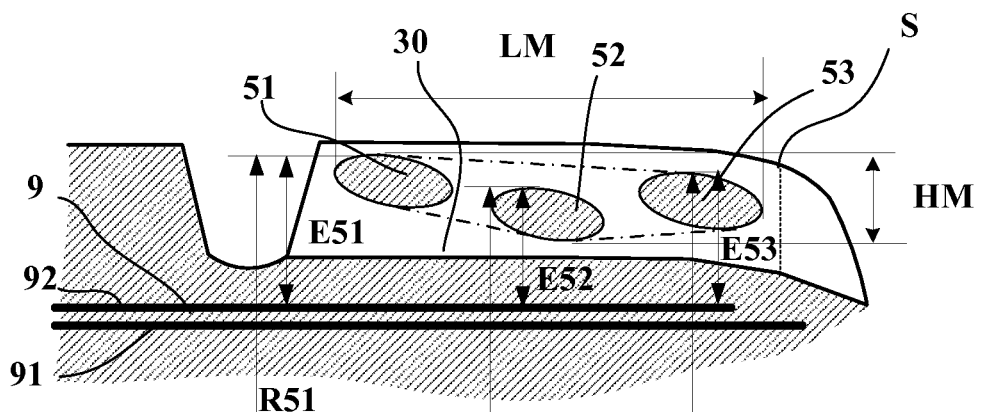
FIG. 3 shows a variant of a tread according to the invention comprising a plurality of bearing blocks in each transverse groove.
Figure 3:

FIG. 3 shows a variant of the tread according to the invention comprising a plurality of bearing blocks in each transverse groove. This FIG. 3 shows that a transverse groove comprises three bearing blocks 51, 52, 53 spaced from one another in the transverse direction (that is to say in a direction parallel to the rotation axis of the tire). Each of these three bearing blocks has a substantially oval section of which the large axis is inclined relative to a direction parallel to the rotation axis. Around these three blocks is defined a virtual contour of shorter length enveloping the said three blocks. Defined as the maximum transverse equivalent length for these three blocks is the maximum length LM in the transverse direction of this enveloping contour. Similarly, defined as a maximum height HM of this enveloping contour is the radial distance separating the two points of this contour that are radially furthest from one another. In this case, in order to satisfy the conditions of the invention, this variant must be such that the length LM is at least equal to twice the height HM. By virtue of this condition, the plurality of bearing blocks is distributed in the transverse direction. Naturally, there must be a passageway between each of the bearing blocks and the bottom 30 of the groove in order to allow water to pass when running in rainy weather. When a groove comprises a single bearing block, the virtual contour enveloping the said block corresponds to its own contour.

This FIG. 3 makes it possible to explain how the numerical limits of the mean surface indentation ratio Tc are calculated for each edge row when several bearing blocks are present. Specifically, this mean surface indentation ratio must be at least equal to 0.7 and at most equal to 1.6 times the ratio E/R and yet more preferably at least equal to 0.8 and at most equal to 1.5 times the ratio E/R.

The value of E is obtained as being the mean calculated for all the grooves comprising active surfaces of the thickness measured between a point of the active surface that is radially outermost and a point that is radially outermost of the reinforcing belt. In the case of the present groove, the thickness to be taken into account corresponds to the thickness E51 of the radially outermost bearing block which corresponds to the axially innermost block 51 for which this thickness E51 is greater than the thicknesses E52 and E53 of the axially outermost bearing blocks 52 and 53.

The value of R is obtained as the mean, calculated for all the grooves comprising active surfaces, of the distance measured between the point of the radially outermost active surface and the rotation axis (represented by the direction XX' in FIG. 3) of the tire provided with the tread. In the case of the present groove, the radially outermost bearing block corresponds to the axially innermost block 51 for which the distance R51 is greater than the distances R52 and R53 of the axially outermost bearing blocks 52 and 53.

Figure 4:
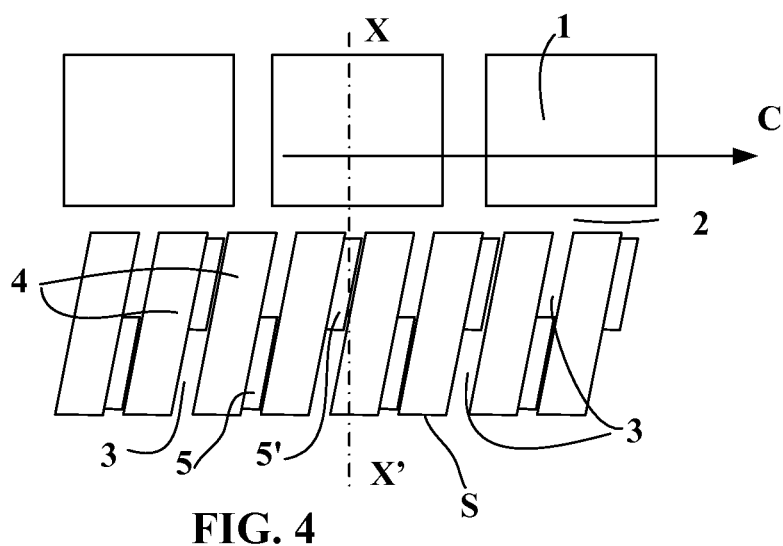
FIG. 4 shows in plan view variant of a tread according to the invention, the bearing blocks being placed in different transverse positions.

FIG. 4 shows in plan view a variant of the tread 1 according to the invention, this tread comprising edge portions forming the axial limits of the tread. The edge portion limited axially on the outside by the limit S and shown in FIG. 4 comprises a plurality of grooves 3 of transverse orientation delimiting with a circumferential groove 2 the ribs 4. "Groove of transverse orientation" in this instance means grooves forming an angle different from zero degrees with a direction parallel to the rotation axis of the tire (in this instance represented by an axis XX'). Each rib 4 comprises, on one of its lateral faces, a bearing block 5, 5'. Note that from one rib to the next rib in the circumferential direction (indicated by an arrow C in the figure), the bearing blocks 5, 5' are placed so as to occupy two different transverse positions in the grooves.

In a similar configuration, if each bearing block 5, 5' comprises an active surface that is at a distance Ha from the adjacent rib with which this surface can come into contact when running, the value of the mean surface indentation ratio Tc is obtained by making the ratio between:

the total of the circumferential lengths of opening Ha of all the active surfaces of the bearing blocks of the edge row in question irrespective of the transverse position of the said bearing blocks, and this is so for all the grooves comprising at least one bearing block, and the total mean circumferential length of the edge tread.

Naturally, when transverse incisions of mean width Hi are also present on the edges of the tread, it is necessary to incorporate them into this calculation of the mean surface indentation ratio since these widths Hi are appropriate so that these incisions are closed in contact when running.

Figure 5:
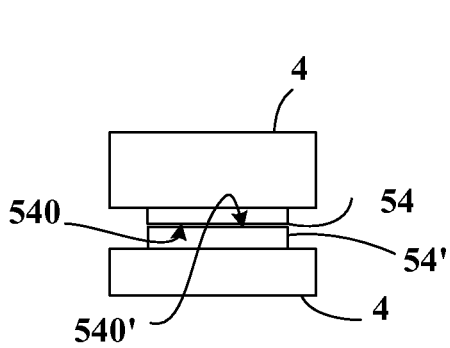
FIG. 5 shows in a view from above a variant bearing block formed of two half-blocks.

FIG. 5 shows a partial view of a tread surface; this view shows two ribs 4 each supporting a half-bearing block 54, 54', these two half-blocks being provided to come into contact against one another on their bearing surfaces 540, 540' respectively, when the tire provided with this tread is running.

Figure 6:
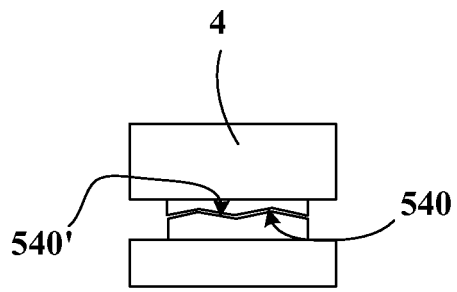
FIG. 6 shows in a view from above a variant bearing block formed of two half-blocks.

Advantageously, the bearing surface corresponding in this case to the surface of contact of one half-block with the other half-block can be not flat in order to limit the relative movements of one half-block relative to the other half-block. FIG. 6 shows such an embodiment according to which each bearing surface 540, 540' of each half-block comprises zigzags capable of interacting with zigzags on the other bearing surface in order to limit the relative movements.

Figure 7:
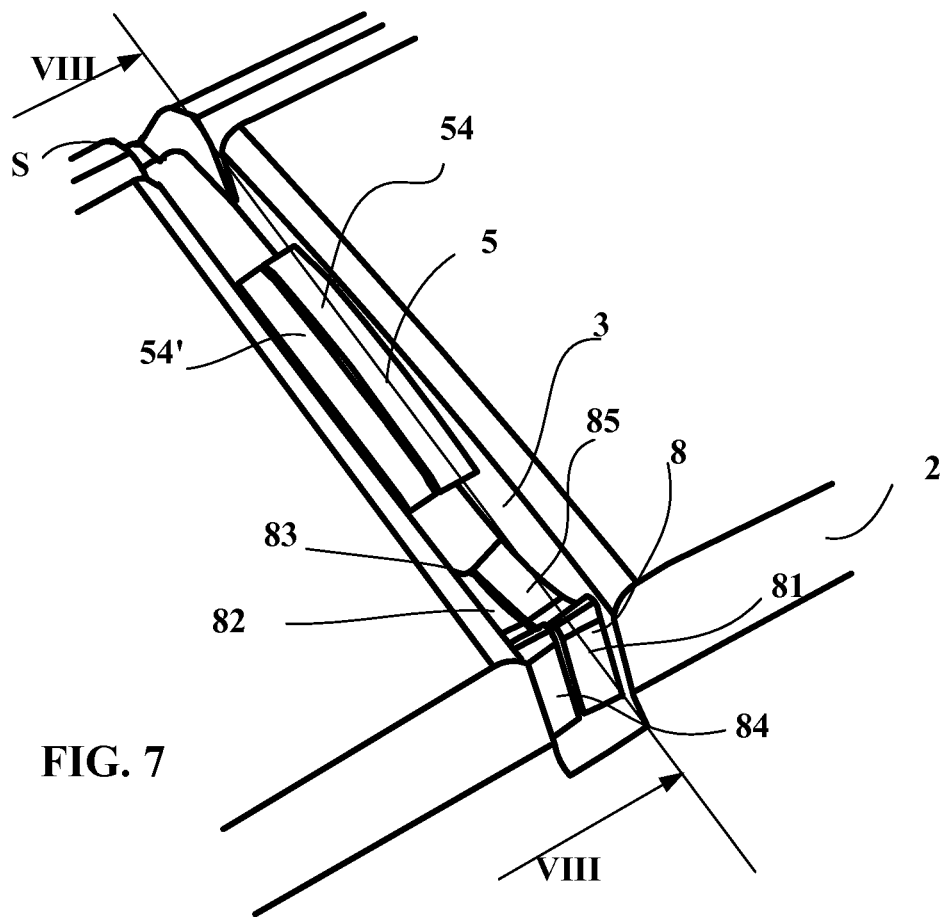
FIG. 7 shows a local plan view of a transverse groove comprising, in addition to a bearing block, a closing block for the groove in order to optimize the flow of water under the bearing block.

FIG. 7 shows a view in perspective of an edge portion of a tread according to the invention. This shows a transverse groove 3 of which one of the ends emerges on the outside of the tread (indicated by the letter S) and of which the other end axially close to the circumferential groove 2 is closed by a closing device 8. This groove comprises another bearing block 5 formed of two half-bearing blocks 54, 54' similar to those shown in FIG. 5.

The closing device 8 consists of two portions 81, 82 separated by an incision 83 capable of being closed when coming into contact. Moreover, this closing device 8 comprises an inner lateral face 84 facing the circumferential groove 2 in order to substantially close the transverse groove 3 and an outer lateral face 85 having a curved geometric shape of which the center of curvature is axially on the outside of the said closing block in order to improve the flow of water in the transverse groove radially under the bearing block 5, that is to say between the bottom of the groove and the bearing block.

Figure 8:
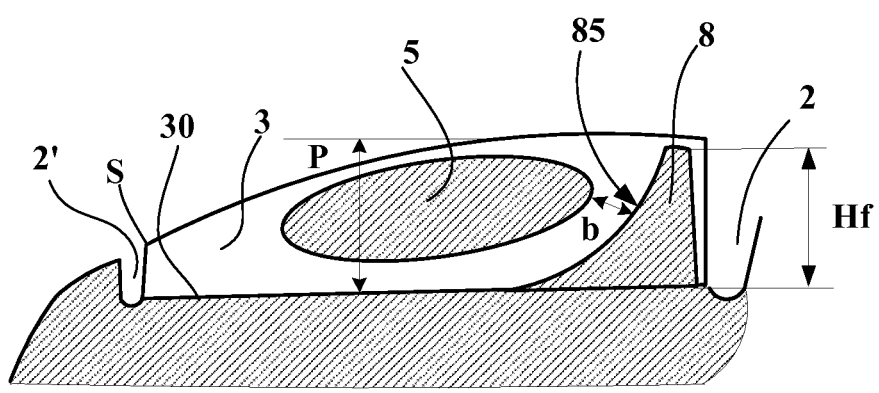
FIG. 8 shows a view in section along the line VIII-VIII from FIG. 7.

FIG. 8 shows a view in section along the line VIII-VIII made in FIG. 7. This FIG. 8 shows that the transverse groove 3 therefore comprises two bearing blocks 5 and 8 which together help in the limitation of the deformations of the edge portion when the tire provided with this tread is running. Consequently, account must be taken of the active bearing surface of the closing device in the calculation of the total area of bearing surface of the groove. In this same FIG. 8, it can be seen that the axially outer contact limit of the tread corresponds to the point marked S (in the new state, that is to say before any running). Moreover, a small circumferential decoupling groove 2' is provided axially on the outside of the tread.

The height Hf of the closing device 8 measured from the bottom 30 of the groove is in this instance equal to 90% of the mean depth P of the groove. Finally, there is a minimum distance b between the lateral surface 85 forming a sort of toboggan with the bearing block 5, this distance being at least equal to 10% of the mean depth P of the transverse groove 3 in order to increase the efficiency of the liquid flow radially under the bearing block 5.

In combination with the variants described, it is possible to add, in the portion of the tread situated between the edge portions, beads provided with incisions similar to those described in patent EP0787601-B1.

The invention is not limited to the examples described and shown and various modifications can be made thereto without departing from its context.

The invention claimed is:

1. A tire reinforced with a carcass reinforcement and with a reinforcing belt radially outside the carcass reinforcement, this tire comprising a tread having a rolling surface designed to come into contact with a ground surface during the running of the tire, this tread comprising grooves of circumferential orientation, these grooves of circumferential orientation delimiting rows of sculpture elements comprising two edge rows axially delimiting the said tread, these edge rows being provided with a plurality of transverse grooves, each transverse groove, with a width at least equal to 2 mm, having a depth and being delimited by walls facing one another, a plurality of the transverse grooves of one edge row comprises at least one bearing block protruding on at least one wall delimiting the groove in question, each bearing block comprising an active surface, that is to say a surface capable of coming into contact with another surface during the passage in contact with the ground surface, this active surface being at a circumferential length of opening Ha from the said other surface, this circumferential length of opening Ha being measured on the tire inflated to its pressure of use, wherein:

the total of the areas of the active surfaces (50) of a transverse groove (3) is at least equal to 10% and at most equal to 50% of the area of the wall surface on which these active surfaces are formed, and wherein the maximum length LM in the transverse direction of a virtual convex surface surrounding all of the active surfaces of a transverse groove and of shorter contour length is at least twice as great as the maximum height HM of this same virtual convex surface taken in the direction of the depth of the transverse groove, and wherein there is at least one passageway for a fluid between each bearing block of a groove and the bottom of the said groove, this passageway having at least a radial height equal to 10% of the depth of the groove, and wherein each edge row has a mean surface indentation ratio Tc, this indentation ratio being calculated by taking the ratio between the total of the circumferential lengths of opening Ha of all the active surfaces of the bearing blocks of the edge row in question, for all the grooves comprising at least one bearing block, and of the circumferential lengths Hi of the transverse incisions, this total being divided by the total circumferential length of the edge tread minus the circumferential lengths of the grooves with no blocks, the mean surface indentation ratio To for each edge row is at least equal to 0.7 and at most equal to 1.6 times E/R, E being the mean calculated for all the grooves comprising active surfaces of the thickness measured between a point of the active surface that is radially outermost and a radially outermost point of the reinforcing belt, R being the mean calculated for all the transverse grooves comprising active surfaces of the distance measured between the point of the active surface that is radially outermost and the rotation axis of the tire provided with the tread, and wherein at least one transverse groove comprising at least one bearing block is also provided with an end closing block supported by at least one wall of the transverse groove over a height, measured from the bottom of the groove, that is at least equal to 80% of the mean depth of the groove, this closing block being formed in the vicinity of a longitudinal groove into which the transverse groove emerges so as to close at least in part the transverse groove and make the flow of liquid in the transverse groove easier.

2. The tread according to claim 1 wherein the closing block comprises an active bearing surface designed to come into contact with another surface when running, the area of the bearing surface of the closing block being at least equal to 5% and at most equal to 30% of the area of the wall surface on which this closing block is formed.

3. The tread according to claim 1 wherein the closing block has an axially inner surface and an axially outer surface, the inner surface facing the longitudinal groove and the outer surface being oriented axially towards the outside of the tread, the outer surface of the closing block has, seen in radial section, a curved shape of which the center of curvature is axially outside the said closing block.

4. The tread according to claim 1 wherein the minimum distance b between the closing block and each of the other bearing blocks of the transverse groove is at least equal to 10% of the depth (P) of the transverse groove.

5. The tread according to claim 1 wherein the mean surface indentation ratio Tc for each edge row is at least equal to 0.8 and at most equal to 1.5 times E/R.

6. The tread according to claim 1 wherein at least one bearing block comprises an inner profile with a curved and convex shape, this inner profile moving away progressively from the bottom of the groove and going axially outwards in order to promote the flow of liquid.

7. The tread according to claim 1 wherein at least one bearing block is formed of two half-blocks supported by the facing walls of a transverse groove.

8. The tread according to claim 1 wherein the active surface of a plurality of bearing blocks has a geometry comprising indentations and raised elements in order to immobilize at least partially and at least in one direction the relative movements of a wall of the groove relative to the facing wall of the groove.

* * * * *